United States Patent
Li et al.

(10) Patent No.: US 11,730,180 B2
(45) Date of Patent: Aug. 22, 2023

(54) METHOD FOR PRODUCING FERMENTED BLOOD SAUSAGE WITH HIGH ANTIOXIDANT ACTIVITY

(71) Applicants: Southwest Minzu University, Chengdu (CN); Industrial Economic Research Institute of Tibetan Qiang Autonomous Prefecture of Ngawa (Small and Medium-sized Enterprises Service Center of Tibetan Qiang Autonomous Prefecture of Ngawa), Weizhou Town. Wenchuan County (CN)

(72) Inventors: Sining Li, Chengdu (CN); Shanhu Tang, Chengdu (CN); Jiajun Xia, Chengdu (CN); Yinchuan Cai, Chengdu (CN)

(73) Assignees: SOUTHWEST MINZU UNIVERSITY, Chengdu (CN); INDUSTRIAL ECONOMIC RESEARCH INSTITUTE OF TIBETAN QIANG AUTONOMOUS PREFECTURE OF NGAWA, Weizhou Town (CN)

(*) Notice: Subject to any disclaimer, the term of this patent is extended or adjusted under 35 U.S.C. 154(b) by 271 days.

(21) Appl. No.: 17/221,804

(22) Filed: Apr. 4, 2021

(65) Prior Publication Data

US 2021/0315241 A1    Oct. 14, 2021

(30) Foreign Application Priority Data

Apr. 10, 2020   (CN) .......................... 202010276904.2

(51) Int. Cl.
  A23L 13/40   (2023.01)
  A23L 13/60   (2016.01)
  A23L 5/10    (2016.01)
  A23B 4/22    (2006.01)

(52) U.S. Cl.
  CPC ............... *A23L 13/48* (2016.08); *A23B 4/22* (2013.01); *A23L 5/15* (2016.08); *A23L 13/65* (2016.08); *A23Y 2220/73* (2013.01)

(58) Field of Classification Search
  CPC ............ A23L 13/48; A23L 13/65; A23B 4/22
  See application file for complete search history.

(56) References Cited

U.S. PATENT DOCUMENTS

| | | | | |
|---|---|---|---|---|
| 4,024,286 A | * | 5/1977 | Cornelius | A23J 3/227 426/62 |
| 5,866,357 A | * | 2/1999 | Dambmann | A23J 3/34 435/68.1 |
| 2003/0091721 A1 | * | 5/2003 | Ohta | A23L 27/21 426/648 |

* cited by examiner

*Primary Examiner* — Donald R Spamer
*Assistant Examiner* — Philip A Dubois
(74) *Attorney, Agent, or Firm* — Flener IP & Business Law; Zareefa B. Flener

(57) ABSTRACT

Provided is a method for producing fermented blood sausage having high antioxidant activity, comprising (1) preparing hemoglobin antioxidant peptide through Plastein reaction; (2) brining and primarily fermenting livestock or poultry meat; (3) deodoring and breaking livestock or poultry blood; (4) filling and secondary fermentation; (5) obtaining a finished product after drying. Compared with prior arts, the present disclosure uses Plastein reaction of blood to prepare a highly active antioxidant peptide, the fermented blood sausage has a total antioxidant capacity up to 6.89 U/mg protein, with an increase rate of 58%. The blood was deodorized, and total amount of free amino acids in secondary fermentation by lactic acid bacteria in combination with yeasts reached 12.74 mg/g, with an increase rate of 42%, providing the fermented blood sausage with better flavor and chewiness. The present disclosure also provides a new approach to comprehensive utilization of livestock or poultry blood resources.

1 Claim, No Drawings

METHOD FOR PRODUCING FERMENTED BLOOD SAUSAGE WITH HIGH ANTIOXIDANT ACTIVITY

CROSS REFERENCE TO RELATED APPLICATION

This disclosure claims the priority of Chinese Patent Application NO. 202010276904.2 entitled Method for producing fermented blood sausage with high antioxidant activity filed with the China National Intellectual Property Administration on Apr. 10, 2020, which is incorporated herein by reference in its entirety.

TECHNICAL FIELD

The present disclosure relates to a meat product and a processing method thereof, in particular to a fermented blood sausage with high antioxidant activity and a preparation method thereof.

BACKGROUND

Blood, as the main by-product in slaughtering and processing of livestock or poultry, is an ideal protein resource. Only 25% of the blood produced by slaughtering of livestock or poultry in China is used in a centralized and reasonable manner, and most of them are discharged as waste, which not only wastes the resources, but also pollutes the environment.

In the Plastein reaction, under enzymatic stress, the ideal exogenous amino acid is added and is synthesized into a new protein, producing new peptides that are not available in the source protein. Gao Dandan et al. hydrolyzed the loach protein with a neutral protease, following a modification of the hydrolysates by a Plastein reaction using papain, with an addition of 0.5 mmol/g of histidine. The modification product of the Plastein reaction has an up to 77.98% scavenging rate of DPPH (1,1-diphenyl-2-trinitrophenylhydrazine) free radical. Che Lihui modified the peptides from the enzymolysis of *Nemopilema nomurai* by adding two exogenous amino acids of proline and arginine through a Plastein reaction. There was an improvement both in DPPH• scavenging rate and in hydroxyl radical scavenging rate of the modified product of Plastein reaction. So far, there is no report on the use of Plastein reaction to improve the antioxidant peptides in the blood.

Blood sausage is a kind of meat and poultry fermented or non-fermented intestine-filling meat products made with blood as the main raw material and supplemented with other raw materials or ancillary materials. Li Fucun studied the productive process of fermented duck blood sausage. The study suggested that the blood sausage quality was the best when duck blood was added in an amount of 25 wt %, the bacterial inoculation amount was $10^7$ cfu/g, and fermentation was performed for 18 hours at 30° C. Gong Jiaxin et al. determined optimal process parameters for fermenting yak blood sausage: an addition amount of 20 wt % of yak blood, a fermentation temperature of 25° C., a fermentation time of 16 h, and an inoculum amount of 1.5% strains. Chinese patent application CN 108835533A discloses a method for preparing blood sausage with long shelf life, which is achieved by a two-stage fermentation process. All of these studies involve direct mixing of blood with livestock or poultry meat to make blood sausage, without concerning either the deodorization of blood, the effective utilization of biologically active substances in the blood, or the fermentation of the probiotic yeast.

SUMMARY OF THE INVENTION

The objective of the present disclosure is to provide a method for producing a fermented blood sausage from livestock or poultry meat that is got rid of fishy smell, is resistant to preservation, and has better flavor and high antioxidant activity.

The technical solution of the present disclosure is as follows.

A method for producing a fermented blood sausage with high antioxidant activity, wherein the method comprises the steps of:

preparing hemoglobin antioxidant peptide through a Plastein reaction, comprising:

collecting fresh livestock or poultry blood, and adding 10 wt % of sodium citrate by weight of the livestock or poultry blood so as to quickly anticoagulate the fresh livestock or poultry blood to obtain an anticoagulated blood;

centrifuging the anticoagulated blood at 4000 r/min for 15 min and collecting the precipitated blood cells and dissolving the precipitated blood cells in distilled water with a volume ratio of 0.6-0.8; adjusting pH to 2.5 after the precipitated blood cells are broken by 40 kHz ultrasound for 10 min to obtain a blood cell reaction substrate;

adding pepsin with a weight ratio of the blood cell reaction substrate to the pepsin being 3000:1, and enzymatically hydrolysing the blood cell reaction substrate at 37° C. for 4.0-7.5 h; after centrifuging at 4000 r/min for 15 min, collecting a supernatant and using the supernatant as a blood cell peptide solution;

adding 1 wt % of L-proline (Pro) and 1 wt % of L-histidine (His) by weight of the blood cell peptide solution, adjusting pH value to 7.5, cooling the blood cell peptide solution to room temperature after maintaining the temperature at 30° C. for 4.0-6.0 h, concentrating the blood cell peptide solution under vacuum until content of solids is approximately 50% to obtain a hemoglobin antioxidant peptide for later use, with pepsin activity being 100 thousand U/g;

brining and primarily fermenting livestock or poultry meat, comprising:

cutting fresh and lean livestock or poultry meat from which fat, fascia and tendons have been removed into 5 cm meat cubes; adding 2.00-3.00 parts by weight of glucose, 3.00-4.00 parts by weight of salt, and 0.12-0.25 parts by weight of five-spice powder, 0.05-0.08 parts by weight of monosodium glutamate, and 0.20-0.40 parts by weight of sodium pyrophosphate per 100 parts by weight of the livestock or poultry meat, homogeneously stirring and brining the meat cubes at 4° C. for 8-12 h;

adding a solution of activated *Staphylococcus carnosus* into the brined meat in an amount of $10^6$ cfu per grain of fresh livestock or poultry meat and mixing, fermenting the resulting mixture at 32-37° C. for 24 h after the mixture is sealed, obtaining a lean primarily fermented livestock or poultry meat for later use;

deodoring and breaking livestock or poultry blood, comprising:

collecting fresh livestock or poultry blood, and adding 10 wt % of sodium citrate by weight of the livestock or poultry blood so as to quickly anticoagulate the fresh livestock or poultry blood to obtain an anticoagulated blood;

adjusting pH to 5.0-5.5, adding 0.1 vol % of acid lipase by volume of anticoagulated blood to the anticoagulated blood, and allowing for enzymolysis at 37° C. for 30 min, then inactivating the lipase at 95° C. for 5 min to obtain deodorized blood, there being a need to break the deodorized blood into 2.5-3.0 cm small deodorized blood particles for later use since the deodorized blood solidifies after a heat treatment, wherein the activity of the acid lipase is 100 thousand U/g;

filling and secondary fermentation, comprising:

mixing the hemoglobin antioxidant peptide, the primarily fermented lean meat, and the deodorized blood small particles, at a weight ratio of hemoglobin antioxidant peptide, primary fermented lean meat of livestock or poultry to small particles of deodorized blood of 0.2:1.0:4.0, so as to form a peptide-meat-blood mixture;

adding, $10^7$ cfu per grain of the peptide-meat-blood mixture, a mixed solution of *Kluyveromyces marxianus* and *Lactobacillus rhamnosus* per gram of peptide-meat-blood mixture and stirring homogeneously, and finally filling the peptide-meat-blood mixture into a natural casing of pig small intestine to obtain a sausage, washing the oil on the surface of the sausage with warm water, and naturally hanging the sausage in a constant-temperature incubator, fermenting the sausage at a constant temperature of 35° C. for 18 h; wherein in the $10^7$ cfu mixed solution, the ratio of *Kluyveromyces marxianus* to *Lactobacillus rhamnosus* is 1.0:2.5;

obtaining a finished product after drying, comprising:

placing the sausage after fermentation in a drying oven and drying the sausage at 50° C. to a moisture content ≤25% to obtain a finished product of the fermented blood sausage.

In some embodiments, the livestock or poultry blood is selected from one or more of pig blood, cattle blood, yak blood, chicken blood, and duck blood.

The acid lipase used in the present disclosure is produced by Shanghai Yuanye Biotechnology Co., Ltd., with an activity of 100 thousand U/g.

Advantages of the Present Disclosure

In the present disclosure, blood cells are treated with pepsin to produce more small-molecule peptides, and the obtained hydrolysate has better gelation property, thermal stability and emulsification property. Furthermore, the modification method through the Plastein reaction improves the antioxidant activity of the peptide effectively. The antioxidant peptide was added to fermented blood sausage, and the DPPH radical scavenging rate of the prepared product increases up to 90% with respect to that is 78% in the control group, the total antioxidant capacity increases by 58%, providing a new approach to comprehensive utilization of animal blood resources.

In the present disclosure acid lipase is used to treat blood, which effectively removes part of amines, aldehydes and alcohols in the blood, and has a better deodorizing effect on the blood.

In the present disclosure *Staphylococcus carnosus* is used to ferment the livestock or poultry meat firstly, and then *Lactobacillus rhamnosus* and *Kluyveromyces marxianusis* used to re-ferment the livestock or poultry meat, blood, etc., while reducing the pH of the product and extending the shelf life, it provides the product with better flavor.

DETAILED DESCRIPTION OF THE EMBODIMENTS

Example 1

Method for producing a fermented blood sausage having antioxidant activity by using yak meat and yak blood, comprising the following steps:

preparing hemoglobin antioxidant peptide through a Plastein reaction, comprising:

collecting fresh yak blood, and adding 10 wt % of sodium citrate by weight of the yak blood so as to quickly anticoagulate the fresh yak blood to obtain an anticoagulated blood;

centrifuging the anticoagulated blood at 4000 r/min for 15 min and collecting the precipitated blood cells and dissolving the precipitated blood cells in distilled water with a volume ratio of 0.8; adjusting pH to 2.5 after the precipitated blood cells are broken by 40 kHz ultrasound for 10 min to obtain a blood cell reaction substrate;

adding pepsin with a weight ratio of the blood cell reaction substrate to the pepsin being 3000:1, and enzymatically hydrolysing the blood cell reaction substrate at 37° C. for 7.5 h; after centrifuging at 4000 r/min for 15 min, collecting a supernatant and using the supernatant as a blood cell peptide solution;

adding 1 wt % of L-proline (Pro) and 1 wt % of L-histidine (His) by weight of the blood cell peptide solution, adjusting pH value to 7.5, cooling the blood cell peptide solution to room temperature after maintaining the temperature at 30° C. for 6.0 h, concentrating the blood cell peptide solution under vacuum until content of solids is approximately 50% to obtain a yak hemoglobin antioxidant peptide for later use, with pepsin activity being 100 thousand U/g;

brining and primarily fermenting yak meat, comprising:

cutting fresh yak meat from which fat, fascia and tendons have been removed into 5 cm meat cubes; adding 3.00 parts by weight of glucose, 3.50 parts by weight of salt, and 0.25 parts by weight of five-spice powder, 0.07 parts by weight of monosodium glutamate, and 0.40 parts by weight of sodium pyrophosphate per 100 parts by weight of the yak meat, homogeneously stirring and brining the meat cubes at 4° C. for 12 h;

adding a solution of activated *Staphylococcus carnosus* into the brined meat in an amount of $10^6$ cfu per grain of fresh yak meat and mixing, fermenting the resulting mixture at 32-37° C. for 24 h after the mixture is sealed, obtaining a lean primarily fermented yak meat for later use;

deodoring and breaking yak blood, comprising:

collecting fresh yak blood, and adding 10 wt % of sodium citrate by weight the yak blood so as to quickly anticoagulate the fresh yak blood to obtain an anticoagulated blood;

adjusting pH to 5.0-5.5, adding 0.1 vol % of acid lipase by volume of anticoagulated blood to the anticoagulated blood, and allowing for enzymolysis at 37° C. for 30 min, then inactivating the lipase at 95° C. for 5 min to obtain deodorized blood, there being a need to break the deodorized blood into 2.5-3.0 cm small deodorized blood particles for later use since the deodorized blood solidifies after a heat treatment, wherein the activity of the acid lipase is 100 thousand U/g.

Table 1 is the detection comparison table of fishy substances in the fresh yak blood after treatment by acid lipase, the data shows that the fresh yak blood treated with acid lipase can eliminate a lot of fishy substances and the effect of removing fishy smell is good.

TABLE 1

The suspected fishy substances (%) in yak blood were detected by GC-MS

| Ser. No. | Suspected fishy substance | Control group | Acid lipase treatment group |
|---|---|---|---|
| 1 | Trimethylamine | 0.13 | not detected |
| 2 | Tert-butylamine | 2.34 | 0.91 |
| 3 | 4-heptylamine | 0.49 | not detected |
| 4 | 2-methylheptanal | 1.11 | 1.01 |
| 5 | Trans-4,5-epoxy-(E)-2-decenal | 2.08 | 0.09 |
| 6 | 3-methyl-1-pentanol | 0.99 | not detected |
| 7 | Trans-2-decenol | 0.22 | not detected |
| 8 | 2-methylpyrazine | 0.22 | 0.34 |
| 9 | 2,5-dimethylpyrazine | 0.14 | 0.08 |

(4) filling and secondary fermentation, comprising:

mixing the hemoglobin antioxidant peptide, the primarily fermented lean meat, and the deodorized blood small particles, at a weight ratio of hemoglobin antioxidant peptide, primary fermented lean meat of livestock or poultry to small particles of deodorized blood of 0.2:1.0:4.0, so as to form a peptide-meat-blood mixture;

adding, $10^7$ cfu per grain of the peptide-meat-blood mixture, a mixed solution of *Kluyveromyces marxianus* and *Lactobacillus rhamnosus* per gram of peptide-meat-blood mixture and stirring homogeneously, and finally filling the peptide-meat-blood mixture into a natural casing of pig small intestine to obtain a sausage, washing the oil on the surface of the sausage with warm water, and naturally hanging the sausage in a constant-temperature incubator, fermenting the sausage at a constant temperature of 35° C. for 18 h; wherein in the $10^7$ cfu mixed solution, the ratio of *Kluyveromyces marxianus* to *Lactobacillus rhamnosus* is 1.0:2.5;

Table 2 shows the total amount of free amino acids that form flavor precursors after this step is 12.74 mg/g, which is 3.76 mg/g more than the non-fermented group, and the growth rate is 42%, making the product more flavorful and lower pH value, inhibiting the growth of harmful bacteria and increasing the shelf life of the product.

TABLE 2

Physicochemical indicator of yak blood sausage after fermentation by *Lactobacillus rhamnosus* and *Kluyveromyces marxianus*

| Physicochemical indicators | Control group | Lactic acid bacteria group | Lactic acid bacteria + yeast fermentation group |
|---|---|---|---|
| pH | 5.21 | 4.75 | 4.69 |
| Total free amino acids (mg/g) | 8.98 | 10.71 | 12.74 |
| Thiobarbituric acid (mg/100 g) | 0.246 | 0.251 | 0.248 |
| Chewiness (g) | 879.40 | 1068.01 | 1176.19 |
| Sensory score | 76.04 | 81.00 | 82.20 |

Note:
The thiobarbituric acid value is an indicator of the degree of lipid oxidation.

(5) obtaining a finished product after drying, comprising:

placing the sausage after fermentation in a drying oven and drying the sausage at 50° C. to a moisture content ≤25% to obtain a finished product of the fermented blood sausage.

Table 3 shows that the total antioxidant capacity of the fermented blood sausage made by the preparation method of this example increases by 2.53 U/mg protein, the increase rate is 58%, and the DPPH free radical scavenging rate increases by 17.71%, the increase rate is 23%. The antioxidant effect is improved significantly.

TABLE 3

Effect of addition of Plastein reaction product for yak blood on antioxidant capacity of fermented blood sausage

| Antioxidant indicator | Fermented sausage without addition of Plastein reaction product | Fermented sausage after addition of Plastein reaction product |
|---|---|---|
| DPPH• scavenging rate (%) | 78.37 | 96.08 |
| Total antioxidant capacity (U/mg protein) | 4.36 | 6.89 |

Example 2

Method for producing a fermented blood sausage having high antioxidant activity by using pig meat (pork) and pig blood, comprising the steps of:

preparing of hemoglobin antioxidant peptide through a Plastein reaction, comprising;

collecting fresh pig blood, and adding 10 wt % of sodium citrate by weight of the pig blood so as to quickly anticoagulate the fresh pig blood to obtain an anticoagulated blood;

centrifuging the anticoagulated blood at 4000 r/min for 15 min and collecting the precipitated blood cells and dissolving the precipitated blood cells in distilled water with a volume ratio of 0.7; adjusting pH to 2.5 after the precipitated blood cells are broken by 40 kHz ultrasound for 10 min to obtain a blood cell reaction substrate;

adding pepsin with a weight ratio of the blood cell reaction substrate to the pepsin being 3000:1, and enzymatically hydrolysing the blood cell reaction substrate at 37° C. for 7.5 h; after centrifuging at 4000 r/min for 15 min, collecting a supernatant and using the supernatant as a blood cell peptide solution;

adding 1 wt % of L-proline (Pro) and 1 wt % of L-histidine (His) by weight of the blood cell peptide solution, adjusting pH value to 7.5, cooling the blood cell peptide solution to room temperature after maintaining the temperature at 30° C. for 5.0 h, concentrating the blood cell peptide solution under vacuum until content of solids is approximately 50% to obtain a pig hemoglobin antioxidant peptide for later use, with pepsin activity being 100 thousand U/g;

brining and primarily fermenting pig meat, comprising:

cutting fresh pig meat from which fat, fascia and tendons have been removed into 5 cm meat cubes; adding 3.00 parts by weight of glucose, 3.00 parts by weight of salt, and 0.20 parts by weight of five-spice powder, 0.07 parts by weight of monosodium glutamate, and 0.30 parts by weight of sodium pyrophosphate per 100 parts by weight of the pig meat, homogeneously stirring and brining the meat cubes at 4° C. for 10 h;

adding a solution of activated *Staphylococcus carnosus* into the brined meat in an amount of $10^6$ cfu per grain of fresh pork and mixing, fermenting the resulting mixture at 32-37° C. for 24 h after the mixture is sealed, obtaining a lean primarily fermented pork for later use;

deodoring and breaking pig blood, comprising:

collecting fresh pig blood, and adding 10 wt % of sodium citrate by weight of the pig blood so as to quickly anticoagulate the fresh pig blood to obtain an anticoagulated blood;

adjusting pH to 5.0-5.5, adding 0.1 vol % of acid lipase by volume of anticoagulated blood to the anticoagulated blood, and allowing for enzymolysis at 37° C. for 30 min, then inactivating the lipase at 95° C. for 5 min to obtain deodorized blood, there being a need to break the deodorized blood into 2.5-3.0 cm small deodorized blood particles for later use since the deodorized blood solidifies after a heat treatment, wherein the activity of the acid lipase is 100 thousand U/g;

filling and secondary fermentation, comprising:

mixing the hemoglobin antioxidant peptide, the primarily fermented lean meat, and the deodorized blood small particles, at a weight ratio of hemoglobin antioxidant peptide, primary fermented lean meat of livestock or poultry to small particles of deodorized blood of 0.2:1.0:4.0, so as to form a peptide-meat-blood mixture;

adding, $10^7$ cfu per gram of the peptide-meat-blood mixture, a mixed solution of *Kluyveromyces marxianus* and *Lactobacillus rhamnosus* per gram of peptide-meat-blood mixture and stirring homogeneously, and finally filling the peptide-meat-blood mixture into a natural casing of pig small intestine to obtain a sausage, washing the oil on the surface of the sausage with warm water, and naturally hanging the sausage in a constant-temperature incubator, fermenting the sausage at a constant temperature of 35° C. for 18 h; wherein in the $10^7$ cfu mixed solution, the ratio of *Kluyveromyces marxianus* to *Lactobacillus rhamnosus* is 1.0:2.5;

obtaining a finished product after drying, comprising:

placing the sausage after fermentation in a drying oven and drying the sausage at 50° C. to a moisture content ≤25% to obtain a finished product of the fermented blood sausage.

Example 3

Method for producing a fermented blood sausage having high antioxidant activity by using chicken meat and chicken blood, comprising the steps of:

preparing hemoglobin antioxidant peptide through a Plastein reaction, comprising:

collecting fresh chicken blood, and adding 10 wt % of sodium citrate by weight of the chicken blood so as to quickly anticoagulate the fresh chicken blood to obtain an anticoagulated blood;

centrifuging the anticoagulated blood at 4000 r/min for 15 min and collecting the precipitated blood cells and dissolving the precipitated blood cells in distilled water with a volume ratio of 0.6; adjusting pH to 2.5 after the precipitated blood cells are broken by 40 kHz ultrasound for 10 min to obtain a blood cell reaction substrate;

adding pepsin with a weight ratio of the blood cell reaction substrate to the pepsin being 3000:1, and enzymatically hydrolysing the blood cell reaction substrate at 37° C. for 7.5 h; after centrifuging at 4000 r/min for 15 min, collecting a supernatant and using the supernatant as a blood cell peptide solution;

adding 1 wt % of L-proline (Pro) and 1 wt % of L-histidine (His) by weight of the blood cell peptide solution, adjusting pH value to 7.5, cooling the blood cell peptide solution to room temperature after maintaining the temperature at 30° C. for 5.0 h, concentrating the blood cell peptide solution under vacuum until content of solids is approximately 50% to obtain a chicken hemoglobin antioxidant peptide for later use, with pepsin activity being 100 thousand U/g;

brining and primarily fermenting chicken meat, comprising:

cutting fresh chicken meat from which fat, fascia and tendons have been removed into 5 cm meat cubes; adding 2.50 parts by weight of glucose, 2.50 parts by weight of salt, and 0.25 parts by weight of five-spice powder, 0.08 parts by weight of monosodium glutamate, and 0.25 parts by weight of sodium pyrophosphate per 100 parts by weight of the chicken meat, homogeneously stirring and brining the meat cubes at 4° C. for 10 h;

adding a solution of activated *Staphylococcus carnosus* into the brined meat in an amount of $10^6$ cfu per grain of fresh chicken meat and mixing, fermenting the resulting mixture at 32-37° C. for 24 h after the mixture is sealed, obtaining a lean primarily fermented chicken meat for later use;

deodoring and breaking chicken blood, comprising:

collecting fresh chicken blood, and adding 10 wt % of sodium citrate by weight of the chicken blood so as to quickly anticoagulate the fresh chicken blood to obtain an anticoagulated blood;

adjusting pH to 5.0-5.5, adding 0.1 vol % of acid lipase by volume of anticoagulated blood to the anticoagulated blood, and allowing for enzymolysis at 37° C. for 30 min, then inactivating the lipase at 95° C. for 5 min to obtain deodorized blood, there being a need to break the deodorized blood into 2.5-3.0 cm small deodorized blood particles for later use since the deodorized blood solidifies after a heat treatment, wherein the activity of the acid lipase is 100 thousand U/g;

filling and secondary fermentation, comprising:

mixing the hemoglobin antioxidant peptide, the primarily fermented lean meat, and the deodorized blood small particles, at a weight ratio of hemoglobin antioxidant peptide, primary fermented lean meat of livestock or poultry to small particles of deodorized blood of 0.2:1.0:4.0, so as to form a peptide-meat-blood mixture;

adding, $10^7$ cfu per grain of the peptide-meat-blood mixture, a mixed solution of *Kluyveromyces marxianus* and *Lactobacillus rhamnosus* per gram of peptide-meat-blood mixture and stirring homogeneously, and finally filling the peptide-meat-blood mixture into a natural casing of pig small intestine to obtain a sausage, washing the oil on the surface of the sausage with warm water, and naturally hanging the sausage in a constant-temperature incubator, fermenting the sausage at a constant temperature of 35° C. for 18 h; wherein in the $10^7$ cfu mixed solution, the ratio of *Kluyveromyces marxianus* to *Lactobacillus rhamnosus* is 1.0:2.5;

obtaining a finished product after drying, comprising:

placing the sausage after fermentation in a drying oven and drying the sausage at 50° C. to a moisture content ≤25% to obtain a finished product of the fermented blood sausage.

What is claimed is:

1. A method for producing a fermented blood sausage having high antioxidant activity, comprising:
   (1) preparing a hemoglobin antioxidant peptide;
   (2) brining and primarily fermenting livestock or poultry meat, comprising:
   cutting livestock or poultry meat from which fat, fascia and tendons have been removed into 5 cm meat cubes; adding 2.00-3.00 parts by weight of glucose, 3.00-4.00 parts by weight of salt, and 0.12-0.25 parts by weight of five-spice powder, 0.05-0.08 parts by weight of monosodium glutamate, and 0.20-0.40 parts by weight of sodium pyrophosphate per 100 parts by weight of the livestock or poultry meat, homogeneously stirring and brining the meat cubes at 4° C. for 8-12 h;

adding a solution of activated *Staphylococcus carnosus* into the brined meat in an amount of $10^6$ cfu per gram of livestock or poultry meat and mixing, fermenting the resulting mixture at 32-37° C. for 24 h after the mixture is sealed, obtaining primarily fermented livestock or poultry meat for later use;

(3) deodoring and breaking livestock or poultry blood, comprising:

collecting livestock or poultry blood, and adding 10 wt % of sodium citrate by weight of the livestock or poultry blood so as to anticoagulate the livestock or poultry blood to obtain an anticoagulated blood;

adjusting pH to 5.0-5.5, adding 0.1 vol % of acid lipase by volume of anticoagulated blood to the anticoagulated blood, and allowing for enzymolysis at 37° C. for 30 min, then inactivating the lipase at 95° C. for 5 min to obtain deodorized blood, there being a need to break the deodorized blood into 2.5-3.0 cm small deodorized blood particles for later use since the deodorized blood solidifies after a heat treatment, wherein the activity of the acid lipase is 100 thousand U/g;

(4) filling and secondary fermentation, comprising:

mixing the hemoglobin antioxidant peptide, the primarily fermented meat, and the deodorized blood small particles, at a weight ratio of hemoglobin antioxidant peptide, primary fermented meat of livestock or poultry to small particles of deodorized blood of 0.2:1.0:4.0, so as to form a peptide-meat-blood mixture;

adding, $10^7$ cfu per gram of the peptide-meat-blood mixture, a mixed solution of *Kluyveromyces marxianus* and *Lactobacillus rhamnosus* per gram of peptide-meat-blood mixture and stirring homogeneously, and finally filling the peptide-meat-blood mixture into a natural casing of pig small intestine to obtain a sausage, washing the oil on the surface of the sausage with warm water, and naturally hanging the sausage in a constant-temperature incubator, fermenting the sausage at a constant temperature of 35° C. for 18 h; wherein in the mixed solution, the ratio of *Kluyveromyces marxianus* to *Lactobacillus rhamnosus* is 1.0:2.5;

(5) obtaining a finished product after drying, comprising:

placing the sausage after fermentation in a drying oven and drying the sausage at 50° C. to a moisture content ≤25% to obtain a finished product of the fermented blood sausage;

wherein in step (1), the hemoglobin antioxidant peptide is prepared through a Plastein reaction, comprising:

collecting livestock or poultry blood, and adding 10 wt % of sodium citrate by weight of the livestock or poultry blood so as to anticoagulate the livestock or poultry blood to obtain an anticoagulated blood;

centrifuging the anticoagulated blood at 4000 r/min for 15 min and collecting the precipitated blood cells and dissolving the precipitated blood cells in distilled water with a volume ratio of 0.6-0.8; adjusting pH to 2.5 after the precipitated blood cells are broken by 40 kHz ultrasound for 10 min to obtain a blood cell reaction substrate;

adding pepsin with a weight ratio of the blood cell reaction substrate to the pepsin being 3000:1, and enzymatically hydrolysing the blood cell reaction substrate at 37° C. for 4.0-7.5 h; after centrifuging at 4000 r/min for 15 min, collecting a supernatant and using the supernatant as a blood cell peptide solution;

adding 1 wt % of L-proline (Pro) and 1 wt % of L-histidine (His) by weight of the blood cell peptide solution, adjusting pH value to 7.5, cooling the blood cell peptide solution to room temperature after maintaining the temperature at 30° C. for 4.0-6.0 h, concentrating the blood cell peptide solution under vacuum until content of solids is approximately 50% to obtain a hemoglobin antioxidant peptide for later use, with pepsin activity being 100 thousand U/g.

* * * * *